(No Model.)

A. G. WATERHOUSE.
VACUUM CREAMER.

No. 260,070. Patented June 27, 1882.

ATTEST:
Julian A. Hurdle.
E. Percy Teal.

INVENTOR:
Addison G. Waterhouse

UNITED STATES PATENT OFFICE.

ADDISON G. WATERHOUSE, OF NEW YORK, N. Y., ASSIGNOR TO CHARLES R. GALLATT, OF PORTAGE, WISCONSIN.

VACUUM-CREAMER.

SPECIFICATION forming part of Letters Patent No. 260,070, dated June 27, 1882.

Application filed November 29, 1881. (No model.)

*To all whom it may concern:*

Be it known that I, ADDISON G. WATERHOUSE, of the city and State of New York, have invented a new and useful Improvement in Vacuum-Creamers, of which the following is a specification.

The invention relates to that class of cream-extractors used in the process of extracting cream from milk by placing the milk in an air-tight chamber, and by exhausting the air from the chamber containing the milk draws all the impure gases from the milk and causes the cream to rise upon its surface.

The invention consists of an air-tight chamber provided with a suitable opening for the introduction of cans containing milk, together with a turning or movable floor, upon which the cans containing milk are placed, and so arranged that the cans containing milk can be moved to and from the opening by turning or moving the floor upon which they rest.

The object of this invention is as follows: First, the cans can be distributed over all parts of a large chamber after introducing them through a small opening in the top of the chamber; second, it does away with the necessity of removing the whole top of the chamber by enabling the cans to be introduced and distributed or taken out through a small opening, which is easily closed air-tight by means of a cover properly constructed, which, being light and small, is more easily handled, secured, or removed; third, by having the cans placed upon a turning or movable floor the cans can be moved about in the cooling liquid or material, which in this process is generally used by turning the floor after the air has been extracted from the chamber.

Figure 1:
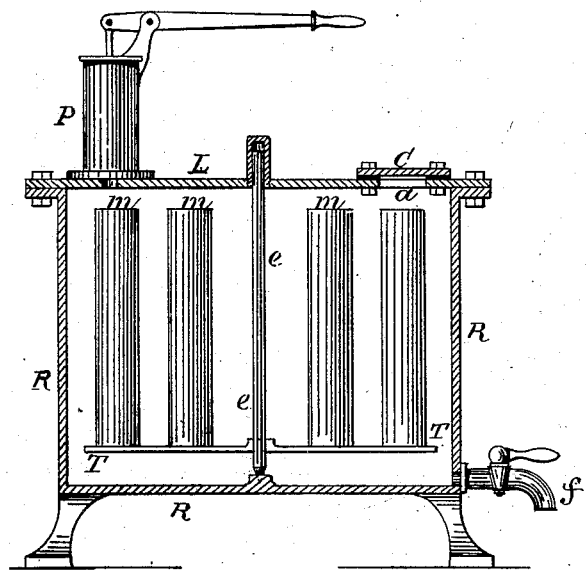

In the accompanying drawings, Figure 1 is an air-tight chamber, R, with a cover or top plate, L, tightly secured to the chamber R by means of suitable bolts or screws with intervening packing. Inside of the chamber R is a turn-table or revolving floor, T, rigidly connected to the upright rotating shaft $e$, pivoted at the bottom in the center of the chamber R, and at the top having a bearing in the plate L, so that the floor T is free to move or rotate. In the top or plate L is an opening, $d$, which is covered by the plate C, securely fastened to L, with intervening packing, so as to form an air-tight joint. The opening $d$ is just large enough to allow the milk-cans $m$ to pass through when the cap C is removed, so that by passing the cans $m$ through the opening and setting them upon the floor T and turning the floor until each can moves away from the opening, the floor can be entirely covered with cans, and, the reverse, by turning the floor each can can be brought to the opening and taken out. The chamber R is provided with an air-pump, P, which can either be placed upon the top L or elsewhere, and by being connected by pipes that enter the chamber at or near the top be used to draw out the air therefrom. $f$ is a cock used to draw the cooling-liquid from the chamber, which liquid is used to surround the cans $m$ for the purpose of keeping the milk in them cool while the air is being exhausted from the chamber for the purpose of extracting the cream from the milk in the cans.

Figure 2:
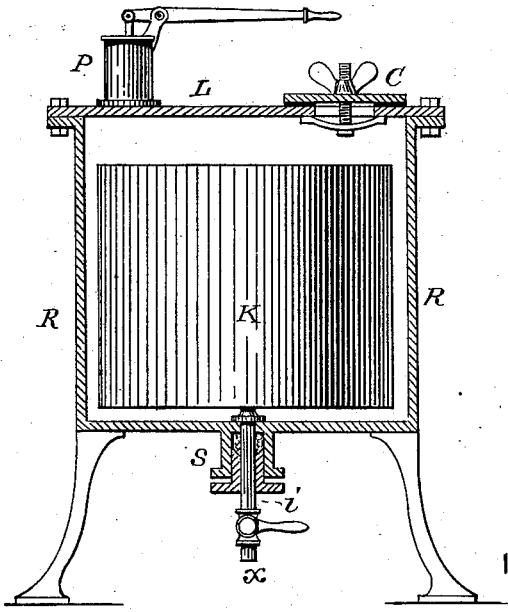

Fig. 2 is another form of chamber, in which a revolving tank, $k$, is used in place of the floor T, as in Fig. 1, which tank $k$ is adapted to receive milk or milk-cans through opening covered by plate C. The cooling-liquid can be drawn off through the central pipe, $i$, provided with cock $x$, which pipe, passing through a stuffing-box, $s$, is free to turn, and with it the tank $k$.

In operation it is generally necessary to have cooling material introduced around the milk-cans $m$, and for such purpose either ice, snow, or cool liquid may be used.

I do not confine myself to the exact form of mechanism shown, nor to the location or use of the pump P, for in place of the pump any method may be employed to exhaust the air from the chamber R, together with the gases rising from the milk contained therein. In some cases, where it is necessary to rotate or remove the floor while the cap C is closed and the air is exhausted from R, I extend the shaft $e$ through a packing-box either at the top or bottom of the chamber, so that by turning the projecting shaft a corresponding movement is imparted to the floor T. Nor is it necessary to have the chamber R with a cover, L, for the top of the chamber may be cast or made a part of the same, and the opening $d$ be made through that part that forms the top.

I do not wish it to be understood that I claim broadly the revolving floor within a chamber, as I know that the same is now used in many forms for other purposes.

What I claim as my invention is—

For a vacuum cream-extractor, an air-tight chamber, R, provided with an air-tight cap, C, made to fit the opening d, said chamber R being provided with a turning floor, T, secured to an upright shaft made to revolve in bearings within the chamber R, said chamber being adapted to receive the milk-cans m, together with suitable refrigerating material, all arranged substantially as and for the purposes set forth.

ADDISON G. WATERHOUSE.

Witnesses:
    E. PERCY TEAL,
    J. F. HURDLE.